United States Patent Office 3,159,607
Patented Dec. 1, 1964

3,159,607
POLYMERIZATION PROCESS
Gaetano F. D'Alelio, South Bend, Ind., assignor, by direct and mesne assignments, to Dal Mon Research Co., Cleveland, Ohio, a corporation of Delaware
No Drawing. Filed May 20, 1958, Ser. No. 736,472
18 Claims. (Cl. 260—82.1)

This invention relates to new catalyst systems. More particularly it concerns catalysts useful in the treatment or processing of vinyl and vinylidene monomers. Specifically this invention deals with the polymerization of olefins and substituted olefins of the formula

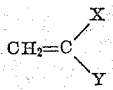

with a catalyst comprising the reaction product of a mixture consisting of (a) an aluminum halide, for example, aluminum chloride and (b) an organoaluminum compound of the formula $Al(R)_3$ wherein R represents a hydrocarbon radical, X represents a member of the class consisting of hydrogen, a halogen, —CN and a saturated aliphatic hydrocarbon radical of no more than six carbon atoms and Y represents a member of the class consisting of a halogen, —CN, —OR', —COOR', —OCOR' and —R', wherein R' is a hydrocarbon group similar in scope to that defined hereinafter for R. Some examples of monomers embraced by the formula

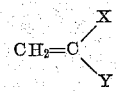

are propylene, butene-1, isobutylene, vinyl chloride, vinylidene chloride, acrylonitrile, vinylidene cyanide, vinyl phenyl ether, butadiene, isoprene, divinyl benzene, diisopropenyl benzene, methyl chloracrylate, etc.

It is know that aluminum chloride and other Friedel-Crafts type catalysts are capable of converting ethylene to oily low-molecular weight products but not to high molecular weight solid polymers. It is likewise known that organoaluminum compounds of the formula $Al(R)_3$, e.g., triethyl aluminum, triisobutyl aluminum, triphenyl aluminum, etc., are ineffective as catalysts in polymerizing olefins such as ethylene, propylene, etc. (J. Poly. Science, XXVI, 120–123 (1957)). It is also known that when ethylene is reacted with triethyl aluminum in the presence of salts, such as nickel chloride, that only low molecular weight hydrocarbons, such as butene-1 and the like are obtained and that the nickel salts are reduced to nickel. Cobalt and platinum salts show the same effect as nickel in that, even in trace amounts with triethyl aluminum, they convert ethylene to butylene. On the other hand it is also known, that alkyl aluminum compounds react with the halides of the transition metals such at titanium tetrachloride, zirconium tetrachloride and the like, to produce catalysts active in the polymerization of ethylene to high density polyethylene. In these cases the catalytic activity is attributed to the complex formed between the excess alkyl aluminum and the insoluble reduced form of the transition metal halide, for example, $TiCl_2$ which is known to have some catalytic activity of its own. From the foregoing, it is obvious that not all combinations of alkyl aluminums and metal salts are effective catalysts in the production of high density high molecular weight polymers from ethylene; and furthermore, as salts from the metals of the periodic tables lower than those in the groups of the transition metals, e.g., nickel chloride, are substituted for the salts of the transition metals, e.g., titanium tetrachloride, only gaseous hydrocarbons or very low molecular weight oily hydrocarbons, are obtained from such catalysts.

It is surprising, therefore, and totally unexpected, that high molecular weight solid polymers may be obtained in any yield from a catalyst consisting of an organoaluminum compound, $Al(R)_3$ and an aluminum halide, for example, aluminum chloride. When the catalysts of this invention are used with ethylene alone, very low yields of solid polymer are obtained but when the substitute olefins are used, such as propylene, styrene, butadiene, methyl methacrylate, etc., are used, higher yields are obtained.

The aluminum halides used in the practice of this invention have the formula $AlX_3$ where X is chlorine, fluorine, bromine and iodine. The catalyst of this invention are mixtures of aluminum compounds of the formula $Al(R)_3$ and $AlX_3$. The nature of the catalysts of this invention is unknown, but they do not appear to be products obtained by a metathesis of radicals to $RAlCl_2$ or $R_2AlCl$ since the reaction product, or part of it, is not soluble in hydrocarbons and because $RAlCl_2$ and $R_2AlCl$ do not produce high polymers when substituted for mixtures of $AlCl_3$ and $AlR_3$. In many cases, the reaction product appears to be a subhalide of aluminum. The reaction between the aluminum halide, $AlX_3$, and the organoaluminum, $Al(R)_3$ can be effected in numerous ways. The aluminum halide, for example, aluminum chloride, preferably should be in a finely divided form and can be mixed directly with the organoaluminum, if solid, and ballmilled or heated to effect reaction, or the finely divided aluminum chloride may be added to a hydrocarbon solution of the solid or liquid organoaluminum compound and used directly, or heated to temperatures corresponding to the boiling point of the solvent at subatmospheric, atmospheric or superatmospheric pressures. Alternately the aluminum halide may be dispersed in an inert hydrocarbon solvent such as a saturated aliphatic hydrocarbon or an aromatic hydrocarbon and added to the undiluted organoaluminum compound or to a solution or dispersion of an organoaluminum compound in an inert medium such as the inert hydrocarbon. To simplify the recovery of solvents from the polymerization system the hydrocarbon in which the catalyst is dispersed or dissolved is preferably the same hydrocarbon in which the polymerization is performed, if a solvent or inert medium is used in the process. Alternately, the $AlX_3$ and the $Al(R)_3$ may be added directly to a suitable reactor at room temperature or below room temperature, and heat applied to the reactor before or during the addition of the olefin.

Any ratio of aluminum halide, e.g., aluminum chloride, to the organoaluminum compound, $Al(R)_3$ may be used in the preparation of the active catalysts of this invention, e.g., between 1 $Al(R)_3$ to 100 $AlCl_3$ to 100 $Al(R)_3$ to 1 $AlCl_3$. Satisfactory results are obtained in the range of 1 $Al(R)_3$ to 10 $AlCl_3$ to 10 $Al(R)_3$ to 1 $AlCl_3$.

It has been found that the nature of the catalyst resulting from the ratio of $Al(R)_3$ to aluminum chloride determines, in part, the nature of the polymer obtained. If a large excess of aluminum chloride is used, or if the reaction between the $Al(R)_3$ and the aluminum chloride is terminated leaving large amounts of aluminum chloride in the mixture, low molecular weight polymers may be obtained. In some cases, if desired, the excess aluminum chloride may be removed from the catalyst mixture by subliming the chloride by passing an inert gas such as helium, through the heated catalyst, or by selective controlled extraction with an aromatic hydrocarbon such as toluene.

The polymerization may be carried out in any convenient manner. The monomer, if liquid, may be added to the catalyst, or the solid catalyst may be added to the liquid monomer; or the solid catalyst may be slurried in an inert medium such as a hydrocarbon, a chlorinated hydrocarbon, aliphatic ethers, aromatic ethers, aliphatic aromatic ethers, cyclic ethers such as tetrahydrofuranes and the like. A gaseous of low boiling monomer such as propylene, is more conveniently polymerized by using an inert liquid medium. In most cases, a polymerization medium is preferred to dissipate the heat of the polymerization reaction and to facilitate the processing of the polymer.

As a polymerization medium, substantially any inert material can be used which is liquid under the conditions of temperatures and pressure employed and which has a dispersing action on the olefin polymerized. Hydrocarbon solvents are preferred, and are preferably free substantially of materials that react with the catalyst such as $O_2$, $H_2O$, alcohols, ketones and the like. Suitable solvents include pentane, hexane, cyclohexane, octane, benzene, chlorobenzene, xylene, toluene and the like. The aromatic hydrocarbons are the preferred solvents.

The amount of catalyst is not critical. Relatively small amounts are operable to form relatively large amounts of polymer. In general, a practical range is 0.001 to 0.1 mol activated aluminum halide per mol of olefin polymerized. Even larger amounts of catalyst are operable, but are uneconomical and increase the problems of purification of the polymer. The R group in the organoaluminum compound, $Al(R)_3$, may be an aliphatic hydrocarbon radical such as methyl, ethyl, propyl, butyl, amyl, octyl, dodecyl, allyl, pentenyl-1, pentenyl-2, pentenyl-3, undecanyl-1, dodecenyl-2, etc., or a cycloaliphatic group such as cyclohexanyl, cyclopentanyl, cyclobutanyl, cyclobutenyl, cyclohexenyl, alkylcyclohexanyl, alkylcyclohexenyl, arylcyclohexenyl, cyclopentadienyl, alkylcyclopentadienyl, etc., or an aralkyl radical such as benzyl, 2-phenylethyl, 1-phenylethyl, phenylpropyl, naphthylethyl, phenylethenyl, etc., or the aromatic and alkyl aromatic radicals such as phenyl, tolyl, xylyl, carbazole, naphthyl, methylnaphthyl, diphenyl, terphenyl, etc. The radical groups represented by R may be the same or different radicals in the compounds, $Al(R)_3$ and those R groups which contain less than about 12 carbon atoms in each R group are preferred because of availability and economy. The organoaluminum compounds of the formula, $Al(R)_3$, have low stability to air, oxygen and water and should be processed or handled in an inert atmosphere such as nitrogen or in an inert gas, or in an inert solvent protected with an inert atmosphere, or transferred from one step or operation to another without exposing them to contamination. In many cases, these organometals may be used without isolation from the solvent or medium in which they have been initially prepared.

The catalysts of this invention are useful in processes utilizing such olefins as the monoolefins, for example propylene, butene-1, isobutylene, the various pentenes, isomeric hexenes, the isomeric heptenes, the various octenes, the various nonenes, the various decenes, etc., or mixed unsaturated petroleum distillates or fractions, vinyl cyclohexane, vinyl cyclohexene, vinyl cycloheptane, styrene, α-methyl styrene, ortho-methyl styrene, meta-methyl styrene, para-methyl styrene, the dimethyl styrenes, the ethyl styrenes, vinyl naphthalene, vinyl diphenyl, vinyl carbazole, the diolefins and triolefins such as butadiene; isoprene; 2,3-dimethyl-butadiene-1,3; 2-ethyl-butadiene-1,3; 4-methyl-pentadiene-1,3; 2-methyl-pentadiene-1,3; hexadiene-2,4; hexatriene-1,3,5; 4-methylhexadiene, allyl benzene, stilbene, allene, diallyl, 1-vinyl cyclohexene-3, divinyl benzene, etc., or mixtures of such mono-, di- and triolefins; vinyl chloride, vinylidene chloride, vinyl cyanide, vinylidene cyanide, methyl α-chloroacrylate, ethyl α-chloroacrylate, methyl α-cyanoacrylate, ethyl α-cyanoacrylate, methyl acrylate, ethyl acrylate, propyl acrylate, benzyl acrylate, methyl methacrylate, ethyl methacrylate, n-butyl methacrylate, vinyl isobutyl ether, vinyl phenyl ether, vinyl acetate, vinyl propionate, vinyl benzoate, etc., alone or in combination with each other to produce copolymers, tripolymers, etc.

The catalysts, as prepared in the practice of this invention, are useful in reacting and polymerizing the above monomers at temperatures ranging from about −75° C. to room temperature or as high as 200° C. or even higher and at pressures ranging from atmospheric or a few atmospheres to pressures as high as 10,000 p.s.i. or higher. For practical operation, however, temperatures in the range of −50° C. to 200° C. and pressures of 50–2000 p.s.i. are suitable.

It is surprising that the catalyst of this invention will form reactive complexes with the metals and compounds of the metals of the class consisting of Ti, Zr, V, Nb, Ta, Cr, Mo, W and Ce. For example, they may be reacted with the free metal, such as Ti, Zr, V, etc. by heating or grinding or ballmilling, which processes are disclosed in my copending applications, Ser. No. 694,104, now Patent No. 3,098,828, filed November 4, 1957, Ser. No. 718,442, filed March 3, 1958, now abandoned, Ser. No. 718,428, filed March 3, 1958, now abandoned, Ser. No. 718,945, March 4, 1958, now Patent No. 3,054,788; Ser. No. 718,946, March 4, 1958, now abandoned, Ser. No. 718,947, filed March 4, 1958, now abandoned, Ser. No. 718,948, filed March 4, 1958, now Patent No. 3,056,770; Ser. No. 718,949, filed March 4, 1958, now Patent No. 3,049,526; Ser. No. 718,950, filed March 4, 1958, now Patent No. 3,065,217, or with the resulting metal compounds disclosed in these applications, to which reference is hereby made. Also the catalysts of this invention may be complexed with the halides of the metals, $M(X)_n$, where X is halogen or OR, $n$ is the valency of the metal and M represents a metal of the class consisting of Ti, Zr, V, Nb, Ta, Cr, Mo, W and Ce, and R is a hydrocarbon radical, as for example, $TiCl_4$, $TiCl_3$, $TiCl_2$, $ZrCl_4$, $ZrCl_3$, $ZrCl_2$, $VCl_3$, $MoCl_5$, $Ti(OCH_3)_4$, etc. In addition, the catalysts of this invention may be complexed with organometals of (1) the formula $M(R)_n$ wherein M, $n$ and R have the same meaning as described above, as well as with the reaction products of $M(R)_n$ and $M(X)_n$ as disclosed in my copending application Serial No. 729,499, filed April 21, 1958, now Patent No. 3,075,957; and (2) with organometals of the formula $(R)_mM(X)_n$ where R, M and X have the same meaning as above and $m$ and $n$ are numerical values of at least one and whose sum is at least 3 and corresponds to the valency of M as well as with the reaction products of $(R)_mM(X)_n$ with at least 1 metal selected from the class of M and Al.

When the catalysts of this invention are complexed with the metal M and its compounds very active catalysts capable of polymerizing olefins, including ethylene, at room temperature and very low pressures are obtained.

The following examples are used by way of illustration and not of limitation of the invention.

*Example 1*

Five-tenths (0.5) gram of aluminum chloride and 10 ml. of 50% solution by weight of triisobutyl aluminum in toluene is added to 100 ml. of toluene in a 200 ml. stainless steel rocking autoclave. The transfer of the catalyst to the autoclave is made in a dry box under a slight pressure of nitrogen to avoid contamination with moisture and oxygen. The reactor is then heated to 140–160° C. and pressured with ethylene to 500–800 p.s.i. Ethylene is rapidly absorbed and the reactor is repressured from time to time to replace the ethylene consumed. After 12 hours the run is terminated, the autoclave cooled, vented and opened, and the crude, solid polyethylene transferred to a container containing about 200 ml. of methanol acidified with HCl and refluxed for 1 hour. The purified, solid, white, high density polyethylene is then separated and dried, and weighs about 0.8 to 1.4 grams. Similar low yields are obtained when other organoaluminum compounds, such as triethyl aluminum; tripropyl aluminum; monomethyl-, diisobutyl aluminum; diethyl-, monophenyl aluminum; diphenyl-, octyl aluminum; triphenyl aluminum; tricyclohexylaluminum, tritolylaluminum; monocyclohexyldinaphthyl aluminum, etc., are used in place of the triisobutyl aluminum of this example. Substitution of the ethylene by other olefins, such as $CH_2=CHCH_3$, $CH_2=CHCH_2CH_3$, $$CH_2=CHC_6H_{11}$$

$CH_2=CHC_6H_9$, $CH_2=CHC_6H_5$ $$CH_2=C-CH=CH_2$$
$$\quad\;\; |$$
$$\quad\;\; CH_3$$

$CH_2=CHC_6H_4CH=CH_2$ $$CH_2=CHC_6H_4\overset{CH_3}{\underset{|}{C}}=CH_2$$

produces the corresponding polymer in good yields, e.g., from 20–80 grams. Also, aluminum fluoride, aluminum bromide, aluminum iodide may be used in place of aluminum chloride or admixed with aluminum chloride, instead of the aluminum chloride of this example.

*Example II*

Five-tenths (0.5) gram of aluminum chloride and 2.5 grams of tripropyl aluminum are added to 100 ml. of toluene as in Example I. Propylene is added to the reaction flask continuously over a period of 8 hours to the reactor heated to 100–130° C., and 60 grams of solid polypropylene is isolated. When butene-1, styrene, vinyl cyclohexane, vinyl cyclohexene are substituted for the propylene, the corresponding polymer is also obtained in good yields.

*Example III*

The procedure of Example I is repeated to produce copolymers from mixtures containing at least two monomers such as: 30 ethylene–70 propylene; 95 styrene–5 vinyl cyclohexane; 90 styrene–10 vinyl cyclohexene; 75 propylene–25 isoprene; 50 butadiene–50 isoprene, etc. The monomer concentration of these examples may be varied over wide ratios to produce copolymers of different compositions.

*Example IV*

The procedure of Example II is repeated to produce heteropolymers from mixtures of olefins containing at least 3 monomers such as: 75 styrene, 15 vinyl cyclohexane, 10 vinyl cyclohexene; 50 propylene, 25 butadiene, 25 isoprene; 65 styrene, 35 hexene-1, 10 divinyl benzene, etc. The monomer concentrations of these examples may be varied over wide ratios to produce copolymers of different compositions.

*Example V*

To the catalyst of Example II, 50 grams of liquid isoprene is added slowly over a period of 5 hours and the mixture is then heated to 50° C. for 3 hours, after which it is cooled and the product added to 1 liter of methanol to precipitate the polymer. Two grams of phenyl-β-naphthyl amine is added to the polymer which is then washed with water and dried. Thirty parts of this polymer are compounded with 1 part of zinc oxide, 1 part of stearic acid, 0.2 part of mercaptobenzothiazole and 0.75 part of sulfur and vulcanized at 270° F. for 30 minutes to produce a vulcanized product with properties similar to vulcanized natural rubber. Butadiene, phenylbutadiene, 2,3-dimethylbutadiene etc. may be used alone or in combination with other dienes, trienes, and monoolefins to produce vulcanizable compositions containing reactive residual double bonds in the polymer.

*Example VI*

Twenty-five parts of a commercial divinyl benzene containing approximately 50 percent of divinyl benzene and 50 percent of ethyl styrene are added slowly at 50° C. and with stirring to 100 parts of toluene containing the catalyst of Example II, contained in a suitable reactor equipped with a stirrer and maintained under an inert atmosphere. Upon completion of the addition of the divinyl benzene mixture the reaction is continued for 5 hours, after which it is cooled and added to a liter of methanol acidified with HCl. The polymer is isolated by filtration, dried and stored under an inert atmosphere. About 18 parts are obtained which contains unsaturation corresponding to a copolymer of the structure

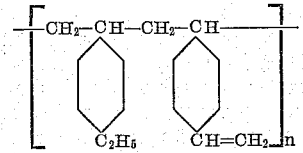

On heating the polymer converts, especially in the presence of a catalyst, as for example, the per-catalysts, such as benzoyl peroxide, a catalytic conversion to the insoluble, infusible state is obtained rapidly. If styrene is added to a mixture of commercial divinyl benzene, then a tripolymer containing styrene, ethyl styrene, and vinyl styrene units is obtained.

*Example VII*

Three grams of aluminum chloride and 1 gram of triisobutyl aluminum are used in the process of Example I to produce about 42 grams of ethylene 50–propylene 50 copolymer.

*Example VIII*

Five-tenths (0.5) gram of aluminum chloride is dissolved in 100 ml. of toluene and 5 grams of triisobutyl aluminum are dissolved in 100 ml. of toluene and are fed by proportioning pumps to a continuous pipe autoclave heated to 160° C. and to which 75 ethylene–25 propylene gas mixture is fed at 900 p.s.i. so that 10 gms. per hour of polymer is continuously produced and released through pressure relief valves. The excess toluene is removed by filtration and recycled to the process. The polymer is washed free of residual aluminum compounds by washing with anhydrous methyl alcohol. The dried polymer may then be pelletized after blending with stabilizers such as 2,4-diisobutyl para-cresol, carbon black, etc.

*Example IX*

Five-tenths (0.5) part of $AlCl_3$ and 1.5 parts of triisobutyl aluminum in 50 parts of benzene are refluxed for 1 hour in a nitrogen atmosphere and cooled to room temperature before adding 20 parts of methyl methacrylate. After 20 hours methanol containing hydrochloric acid was added to the mixture to precipitate the polymer which was washed with methanol and dried. Yield of polymer approximately 16.3 parts. Substitution of the methyl methacrylate by styrene, vinyl acetate, butadiene, methyl acrylate and acrylonitrile yields polymers in yields varying from 9 to 19.4 parts. When vinyl chloride is used, the polymerization is performed in a closed system or an autoclave. Isobutylene may also be polymerized by the catalyst of this example but at temperature of about −75° C., preferably in the presence of liquid propane; and if part of the isobutylene is replaced by a diene, as for example isoprene, as for example in the ratio of isoprene, 16–18 parts of butadiene 2–4 parts, a vulcanizable copolymer is obtained. By using other pair of monomers, as for example styrene-acrylonitrile, methyl methacrylate-butadiene, isobutylene-vinyl-isobutyl ether, etc., the corresponding copolymers are obtained.

*Example X*

To the catalyst of Example I, there is added 2 parts of $TiCl_3$ and the experiment repeated with ethylene and there is obtained 94 grams of high density polyethylene. When the other compounds of the metal M referred to hereinabove are substituted for the $TiCl_3$, similar high yields of polyethylene are obtained, as for example with TiCl₂, TiCl₄, ZrCl₄, VCl₃, etc. These complexed catalysts are also effective in preparing the polymers and copolymers described in Examples I–IX inclusive.

The high molecular weight polyolefins obtained by the practice of this invention can be used in any conventional manner now being used by the polyolefins formed by the prior art procedures. Such uses include film, moldings, pipes, tire, tubing, fibers, filament, extruded articles, laminated products and the like.

When low molecular weight polymers are obtained by the process of this invention, they are useful as chemical intermediates in the alkylation, epoxidation, chlorination, sulfonation, etc., and as plasticizers for the solid polymers produced by the procedures described herein.

I claim:

1. The process of polymerizing a mixture containing at least one monomer of the structure

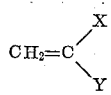

with a preformed catalyst composition consisting of the reaction product of an aluminum halide and an organo-aluminum compound of the formula, AlR₃, wherein X represents a member of the class consisting of hydrogen, halogen, CN and a saturated aliphatic hydrocarbon radical of at least one and not more than six carbon atoms, Y represents a member of the class consisting of a halogen, —CN, —OR', —COOR' and R', said R being selected from the class consisting of aliphatic, cycloaliphatic and aromatic hydrocarbon radicals, said hydrocarbon radicals each having no more than 12 carbon atoms therein, said R' being selected from the class consisting of aliphatic, cycloaliphatic and aromatic hydrocarbon radicals, said hydrocarbon radicals each having no more than 12 carbon atoms therein, said preformed catalyst composition being prepared by the reaction of 0.01–100 parts by weight of AlR₃ per part by weight of aluminum halide, and said monomer being polymerized in the presence of 0.001 to 0.1 mole of said catalyst per mole of said monomer.

2. The process of claim 1 in which the aluminum halide is aluminum chloride.

3. The process of claim 1 in which the aluminum halide is aluminum chloride, and in which the R groups in Al(R)₃ are selected from the group consisting of aliphatic and cycloaliphatic radicals.

4. The process of claim 3 in which the monomer is an olefin having at least three carbon atoms.

5. The process of claim 3 in which the olefin is a diolefin.

6. The process of claim 3 in which the olefin is a mixture of olefins.

7. The process of claim 3 in which the polymerizable mixture comprises at least one monomer of the group consisting of vinyl chloride, vinylidene chloride, acrylonitrile, methyl methacrylate, ethyl methacrylate, methyl acrylate, ethyl acrylate, styrene, butadiene, isoprene and isobutylene.

8. The process of claim 3 in which the polymerization is performed in an inert hydrocarbon solvent.

9. The process of claim 3 in which the polymerization is performed continuously by proportioning continuously a hydrocarbon solution of aluminum chloride and Al(R)₃ and the monomer into intimate contact with each other and continuously withdrawing reaction product from the resultant mixture.

10. The process of claim 4 in which the olefin is propylene.

11. The process of claim 4 in which the olefin is butene-1.

12. The process of claim 4 in which the olefin is styrene.

13. The process of claim 4 in which the olefin is a butadiene.

14. The process of claim 4 in which the olefin is isoprene.

15. The process of claim 6 in which the olefin is a mixture of monoolefins.

16. The process of claim 6 in which the olefin is a mixture of diolefins.

17. The process of claim 6 in which the olefin is a mixture of monoolefins and diolefins.

18. The process of claim 8 in which the polymerization is performed at −70 to 150° C. and at pressures up to 2000 p.s.i.

References Cited in the file of this patent

UNITED STATES PATENTS

| | | |
|---|---|---|
| 2,491,116 | Kraus et al. | Dec. 13, 1949 |
| 2,699,457 | Ziegler et al. | Jan. 11, 1955 |
| 2,786,860 | Ziegler et al. | Mar. 26, 1957 |
| 2,886,561 | Reynolds et al. | May 12, 1959 |
| 2,948,713 | Lemiszka et al. | Aug. 9, 1960 |

FOREIGN PATENTS

| | | |
|---|---|---|
| 533,362 | Belgium | May 16, 1955 |
| 785,314 | Great Britain | Oct. 23, 1957 |
| 1,007,999 | Germany | May 9, 1957 |